US007343615B2

(12) United States Patent
Nelson et al.

(10) Patent No.: US 7,343,615 B2
(45) Date of Patent: Mar. 11, 2008

(54) TELEVISION PROXIMITY SENSOR

(75) Inventors: Daniel J. Nelson, Port Richey, FL (US); John C Peiffer, New Port Richey, FL (US); Venugopal Srinivasan, Palm Harbor, FL (US)

(73) Assignee: Nielsen Media Research, Inc., New York, NY (US)

( * ) Notice: Subject to any disclaimer, the term of this patent is extended or adjusted under 35 U.S.C. 154(b) by 317 days.

(21) Appl. No.: 11/037,277

(22) Filed: Jan. 18, 2005

(65) Prior Publication Data

US 2005/0125820 A1 Jun. 9, 2005

Related U.S. Application Data

(63) Continuation of application No. 10/125,577, filed on Apr. 19, 2002, now Pat. No. 7,100,181.

(60) Provisional application No. 60/313,816, filed on Aug. 22, 2001.

(51) Int. Cl.
*H04N 9/00* (2006.01)
*H04N 7/16* (2006.01)

(52) U.S. Cl. ............................ 725/19; 725/15; 725/17; 725/18

(58) Field of Classification Search ............... 725/9–21
See application file for complete search history.

(56) References Cited

U.S. PATENT DOCUMENTS 2,903,508 A 9/1959 Hathaway
4,574,304 A 3/1986 Watanabe et al.
4,605,958 A 8/1986 Machnik et al.
5,294,981 A 3/1994 Yazolino et al.
5,481,294 A 1/1996 Thomas et al.
5,839,050 A 11/1998 Baehr et al.
6,272,176 B1 8/2001 Srinivasan
6,380,988 B1 4/2002 Sung
6,421,445 B1 * 7/2002 Jensen et al. ............... 380/253
6,484,316 B1 * 11/2002 Lindberg ..................... 725/17
6,487,719 B1 11/2002 Itoh et al.

FOREIGN PATENT DOCUMENTS

EP 0946012 A 9/1999

OTHER PUBLICATIONS

International Search Report from Corresponding Patent Application No. PCT/US02/12333 Apr. 7, 2003.

* cited by examiner

*Primary Examiner*—Hunter B. Lonsberry
(74) *Attorney, Agent, or Firm*—Hanley, Flight & Zimmerman, LLC

(57) ABSTRACT

Systems and methods for determining whether a television is on and in near proximity are provided. An example system includes a sensor, an analog-to-digital converter, and a digital signal processor. The digital signal processor processes a set of digital audio samples detected by the sensor to determine if the sensor is in near proximity to a television in an on state.

10 Claims, 2 Drawing Sheets

TELEVISION PROXIMITY SENSOR

RELATED APPLICATION

This patent is a continuation of U.S. application Ser. No. 10/125,577, which was filed on Apr. 19, 2002 now U.S. Pat. No. 7,100,181, and which claims priority under 35 U.S.C. § 119(e) to U.S. provisional Application Ser. No. 60/313,816, entitled “Television Proximity Sensor”, filed Aug. 22, 2001. The contents of U.S. application Ser. No. 10/125,577 and U.S. provisional Application Ser. No. 60/313,816 are hereby incorporated herein by reference.

FIELD OF THE DISCLOSURE

The present invention relates to apparatus and methods for determining whether a television is on and in near proximity to a sensor, and, more particularly, to apparatus and methods for determining whether a television audience member is in the same room as a television that is turned on.

BACKGROUND

Television audience measurement systems are based either on portable devices carried by members of the audience, or on fixed devices placed in the vicinity of a television set. In both these applications, a microphone on the device picks up an audio signal associated with a television program. The usual objective is to determine the program or channel being viewed from an analysis of the audio signal. For example, in one approach, the device computes a “signature” for subsequent matching with a reference signature recorded at a central facility. Alternatively, in a second approach, the device extracts embedded identification codes that have been inserted into the audio stream at the broadcast facility, in order to identify the program.

One of the problems encountered by a portable device is to determine whether the audio signal picked up by the microphone is originating from a nearby television set. The microphone in such devices, being extremely sensitive, can respond to audio signals emitted in a neighboring room. There is a need to disregard such audio and process only the audio emanating from within a room in which the carrier of the device is present. In the case of the fixed device, it is essential to determine whether or not the television set is turned on or off.

DETAILED DESCRIPTION OF THE PREFERRED EXAMPLES

Figure 1:
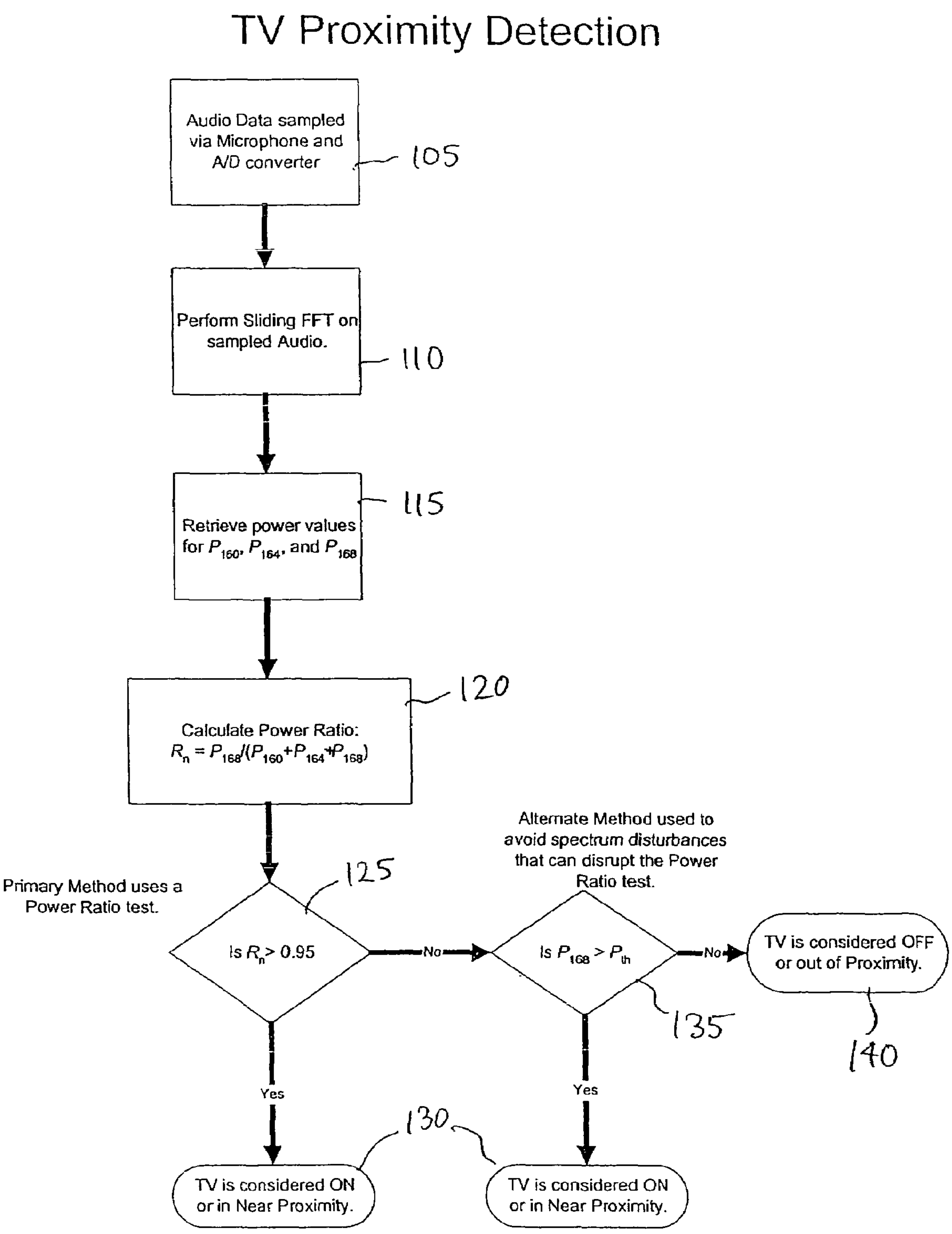
FIG. 1 is a flowchart illustrating a method of determining whether a television is considered on and in near proximity.

The present invention is based on the detection of a television display device property to determine whether the television is on. For example, all television sets with Cathode Ray Tube (CRT) displays contain circuitry for scanning an electron beam across the picture tube. The transformers, which generate the required voltage to perform scanning, emit a characteristic audio signal (e.g., transformer buzz). This audio signal permeates the vicinity of a television set. Vibrations of the laminations within the transformer generate the audio. In a television system operating with the NTSC standard, the horizontal scan fly-back transformers emit a 15.75 kHz wave. The presence of this characteristic frequency can be detected from the audio signal picked up by the microphone. This high frequency tone has a fixed intensity for a given television set. It typically does not penetrate through walls, and as a result, only a microphone placed in the same room as the television set can pick up the characteristic frequency. Either an analog phase locked loop or a digital Fast Fourier Transform (“FFT”) can be used to detect this signal. Of course, other characteristic signals emitted from a CRT, Liquid Crystal Display (LCD), or other display device may be used.

Accordingly, as used in this patent application, as applied to a television and a microphone or other appropriate signal detector, the term “in near proximity” is defined as “within the same room and with no physical obstruction, such as a wall, floor, or ceiling, between the television and the detector”, and the term “out of proximity” is defined as “not in the same room and with a physical obstruction, such as a wall, floor, or ceiling, between the television and the detector”. Thus, the microphone is able to detect the characteristic audio signal for a television that is in near proximity, but the microphone is not able to detect the characteristic audio signal for a television that is out of proximity. When the microphone is attached to a portable device that is being carried by a member of the television audience, determination of whether the television is “in near proximity” or “out of proximity” becomes equivalent to a determination of whether the member of the television audience carrying the portable device is in the same room as a television that is turned on.

If an FFT is used to detect the signal, this can be advantageously embodied in the type of audience measurement system in which “active” embedded codes are detected in the program signal. The extraction of these codes usually involves a spectral analysis of the detected audio using an FFT. The FFT analysis can be easily extended to analyze the frequency neighborhood around the characteristic frequency emitted by the television set. Based on spectral power, the sensed audio can be classified as originating from a television signal or other audio.

The presence of an audio signal at the fly back frequency of 15.75 kHz can be most conveniently detected by means of a “sliding” implementation of the Fast Fourier Transform (hereinafter referred to as “SFFT”). Such an implementation can continuously monitor the spectral power in a neighborhood surrounding the frequency of interest and compute the relative as well as the absolute power of the 15.75 kHz signal. It is noted that in extracting embedded “active” spectral audio codes of the type described in U.S. Pat. No. 6,272,716 (entitled “Broadcast Encoding System and Method” and incorporated herein by reference), the SFFT algorithm is employed.

Figure 2:
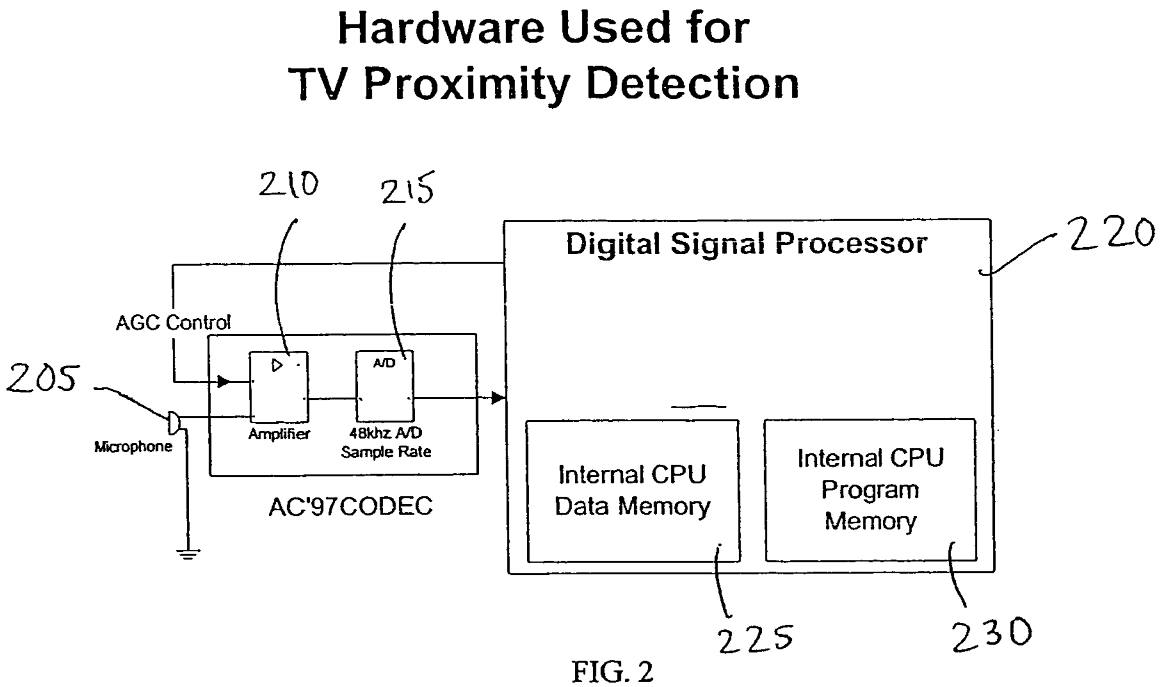
FIG. 2 is a block diagram showing a system for determining whether a television is considered on and in near proximity.

Referring to FIG. 1, a flow chart 100 illustrates an example method of determining whether a television is turned on and in near proximity. Referring also to FIG. 2, an example hardware implementation 200 of a television proximity sensor is shown. In block 105, the audio signal picked up by the microphone 205 is generally amplified by an amplifier 210 and converted into a digital stream by an analog-to-digital converter 215. Then, at block 110, an SFFT is computed using the digital signal processor 220. The digital signal processor 220 includes an internal data memory 225 and an internal program memory 230. The program memory 230 stores the SFFT algorithm, as well as any other algorithms used by the processor 220. The data memory 225 stores data, including the results of performing the SFFT at block 110. In order to compute the Fourier spectrum, a buffer comprising $N_s$=512 audio samples captured at a 48 kHz sampling rate may be used. The spectral frequency indices ("bins") ranging from 0 to 255 represent frequencies in the range 0 to 24 kHz. The frequency separation between adjacent spectral lines is preferably 93.75 Hz. The horizontal scanning frequency (i.e., 15.75 kHz) corresponds to a bin with index 168. In a typical operating environment, such as a room in a household, the spectral energy in the 15 kHz band is extremely low and is on the order of −60 dB. In order to obtain a relative spectral magnitude of the frequency of interest, the power in bins 160, 164 and 168 is computed at block 115. It is noted that the detection of other characteristic signals would involve the measurement of energy in different bins.

Unlike the well-known Fast Fourier Transform, which computes the complete spectrum of a given block of audio, the sliding FFT or SFFT is more useful for computing power in selected frequency bins and constantly updating the spectrum as new audio samples are acquired. Assuming that spectral amplitude $\alpha_0[J]$ and phase angle $\phi_0$ [J] are known for a frequency with index J for an audio buffer currently stored in the buffer, these values represent the spectral values for the $N_s$ audio samples currently in the buffer. If a new time domain sample $v_{N_s-1}$ is inserted into the buffer to replace the earliest sample $v_0$, then the new spectral amplitude $\alpha_1[J]$ and phase $\phi_1[J]$ for the index J are given by the following equation (Equation 1):

$$a_1[J]\exp\varphi_1[J] = a_0[J]\exp\varphi_0[J]\exp\left(-\frac{i2\pi J}{N_s}\right) + \left(v_{N_s-1}\exp\left(\frac{i2\pi J(N_s-1)}{N_s}\right)\right) - \left(v_0\exp\left(-\frac{i2\pi J}{N_s}\right)\right)$$

$$= (a_0[J]\exp\varphi_0[J] + v_{N_s-1} - v_0)\exp\frac{-i2\pi J}{N_s}$$

Thus, the spectral amplitude and phase values at any frequency with index J in an audio buffer can be computed recursively merely by updating an existing spectrum according to Equation 1. The updated spectral power is $P_J=\alpha_1^2$. Even if all the spectral values (amplitude and phase) were initially set to 0, as new data enters the buffer and old data gets discarded, the spectral values gradually change until they correspond to the actual Fourier Transform spectral values for the data currently in the buffer. In order to overcome certain instabilities that may arise during computation, multiplication of the incoming audio samples by a stability factor usually set to 0.999 and the discarded samples by a factor $0.999^{N_s-1}$ may be used. The sliding FFT algorithm provides a computationally efficient means of calculating the spectral components of interest for the $N_s-1$ samples preceding the current sample location and the current sample itself.

At block 120, in order to detect the presence of a television set that is turned on, or to check if an audio signal picked up by the microphone is associated with a television set, the ratio $$R_n = \frac{P_{168}}{P_{160} + P_{164} + P_{168}}$$

is computed for each block of audio indexed by n. When a television set is turned on, this ratio has a value close to 1.0 because $P_{168}>>P_{160}+P_{164}$. When a television is in the off state, the ratio is close to 0.333 because all three frequency bins have low power values. At block 125, a ratio threshold such as $R_{th}$=0.95 can then be used to detect the state of the television set. At block 135, when used in conjunction with an "active" embedded audio code-decoding algorithm, the absolute value of $P_{168}$ at an instant of time when an embedded code has been successfully extracted may be used to set an additional reference value $P_{th}$. Both conditions $R_n>R_{th}$ and $P_{168}>P_{th}$ may be used to determine the state of the television set at a given instant of time. If either of these inequalities is true, then at block 130 it is determined that the television is turned on and in near proximity. If both inequalities are false, then at block 140 it is determined that the television is either turned off or out of proximity. It is noted that the ratio threshold $R_{th}$ can be chosen to be any appropriate value between 0 and 1; for example, $R_{th}$ may be chosen as 0.6, 0.75, or 0.9.

The use of the ratio threshold as described above in block 125 has the effect of providing an adaptive measure of the television audio spectrum at the frequencies of interest. The use of the absolute power level of bin 168 as described above in block 135 provides a method of mitigating a possible "clipping" effect that may occur if the audio power exceeds the maximum power allowed by the automatic gain control. For example, if a noise spike occurs due to a television program, it is possible that the audio power will reach the maximum possible level, and thus the measurement of the power level will be clipped at that maximum level. In such an instance, the ratio $R_n$ may drop below 0.95, because the power levels in $P_{160}$ and $P_{164}$ have risen proportionately as the noise spike. Despite this, the use of the threshold value $P_{th}$ enables the detection of the presence of a television set that is turned on. The threshold value $P_{th}$ can also be adaptive to a particular television, and is not limited to bin 168. Rather, the threshold can be applied to whatever bin happens to sustain the maximum power levels for the neighborhood of the frequency of interest, typically 15.75 kHz.

In a practical implementation, a sequence of $R_n$ and $P_{168}$ values covering a long interval of time (typically on the order of seconds) is examined for determining the presence of a television set that has been turned on. In such a sequence, if a majority of the entries indicate that the television set is turned on, a decision can be made that an active television set is present. Alternatively, an averaging of the ratio and power values captured in the sequence can also be used for decision-making. Several stray effects can occasionally produce spectral energy at 15.75 kHz and averaging the observations over a longer interval results in greater reliability. Yet another factor to be taken into account is the presence of an Automatic Gain Control (AGC) amplifier that may cause a change in the absolute value of $P_{168}$. If the AGC is software controlled, the reference value $P_{th}$ used for comparison can be varied based on the actual instantaneous gain setting.

An alternative method of detecting whether a television is turned on involves observing a transient effect in the frequency spectrum which is associated with the actual transition from the off state to the on state. When a television has been in the off state and is presently turned on, an audio pulse of energy moves through the frequency spectrum in a "ripple"-like fashion from 0 Hz up to the 15.75 kHz steady-state frequency. Thus, a detection of the frequency ripple acts as an indicator that the television has been turned on.

The technique described above may be applied to television systems operating with standards other than the NTSC standard, whose horizontal scan fly-back transformer frequency is actually 15.734 kHz. For example, the PAL standard has a horizontal scan fly-back transformer frequency of 15.635 kHz. Line doublers can be used with either the NTSC standard or the PAL standard. The use of a line doubler has the effect of doubling the frequency, to 31.47 kHz in the NTSC case and 31.25 kHz in the PAL case. Digital television includes several formats that are associated with the following frequencies: 15.63 kHz; 26.97 kHz; 27.00 kHz; 28.13 kHz; 31.25 kHz; 31.47 kHz; 33.72 kHz; 33.75 kHz; 44.96 kHz; 45.00 kHz; 62.50 kHz; 67.43 kHz; and 67.50 kHz. In each case, the audio is sampled at a rate which is at least double the fly-back frequency. Thus, for example, if a 96 kHz sampling rate is used instead of the 48 kHz rate described above, then any format associated with a fly-back frequency not exceeding 48 kHz may make use of the technique of this invention. In the case of the 67.50 kHz format, the sampling rate is at least 135 kHz.

From the foregoing, persons of ordinary skill in the art will appreciate that the disclosed television proximity detector is intended for use in an audience measurement system based either on portable audience measurement devices carried by members of the audience or on fixed audience measurement devices placed in the vicinity of a television set. In both these applications, a sensor on the audience measurement device picks up the audio signal associated with a television program with the objective of determining the program or channel being viewed from an analysis of the audio signal. Because the microphone of the audience measurement device can respond to signals emitted in a neighboring room, there is a need to disregard such signals and instead process audio emanating from within a room in which the device is present to identify programs or channels being presented in the room in which the device is located. By attempting to detect audio noise associated with being in proximity to a television in the on state, the television proximity detector enables the audience measurement system to disregard signals detected when the audience measurement device is not in proximity to a television in the on state.

While the present invention has been described with respect to what is presently considered to be the preferred embodiments, it is to be understood that neither the invention nor the scope of this patent is limited to the disclosed embodiments. To the contrary, this patent is intended to cover various modifications and equivalent arrangements included within the spirit and scope of the appended claims. For example, it is to be understood that the invention is applicable to and this patent covers any frequency that can reliably be associated with the fact that a television is actually on, such as a motor spin of a video-cassette recorder (VCR), a tray ejection of a VCR, a motor spin of a digital video disk (DVD) player, a modem connected to the television, or static electricity emitted by the television screen. As another example, although a ratio threshold of $R_{th}$=0.95 is described above, the ratio threshold $R_{th}$ may be set to a lower value such as 0.8 or 0.75 without reducing detection reliability. The scope of the following claims is to be accorded the broadest interpretation so as to encompass all such modifications and equivalent structures and functions.

What is claimed is:

1. A television proximity sensor system, comprising:

an audio sensor configured to detect at least one of an audio code and an audio signature to identify a tuned television program, the audio sensor being configured to detect a predetermined audio signal emitted by a television when the television is on, the audio sensor being configured to detect the predetermined audio signal when there is no wall or floor between the television and the audio sensor and to not detect the predetermined audio signal when there is a wall or floor between the television and the audio sensor;

an analog-to-digital converter in communication with the audio sensor, and configured to convert the detected audio signal into a set of digital audio samples; and a digital signal processor in communication with the analog-to-digital converter, the digital signal processor being configured to attempt to process the set of digital audio samples and to cause the at least one of the audio code and the audio signature to be disregarded when the predetermined audio signal is not detected.

2. A television proximity sensor system as defined in claim 1, wherein the digital signal processor implements a sliding Fast Fourier Transform (FFT) to attempt to process the set of digital audio samples.

3. A television proximity sensor system as defined in claim 2, wherein the sliding FFT is used to monitor a spectral power density indicative of whether the television is powered on with no wall or floor between the television and the audio sensor.

4. A television proximity sensor system as defined in claim 1, wherein the digital signal processor determines whether to discard the at least one of the audio code and the audio signature by comparing a ratio $$R_n = \frac{P_{Bin1}}{P_{Bin3} + P_{Bin2} + P_{Bin3}}$$

to a threshold, wherein each of $P_{Bin1}$, $P_{Bin2}$, $P_{Bin3}$, respectively represents a spectral power of a corresponding frequency bin.

5. A television proximity sensor system as defined in claim 1, wherein the digital signal processor determines whether to discard the at least one of the audio code and the audio signature by comparing a ratio of power spectral values for at least two frequency bins to mitigate a clipping effect which occurs when audio power exceeds a maximum power allowed by an automatic gain control circuit.

6. A media presentation device proximity sensor system, comprising:

an audio sensor configured to detect at least one of an audio code and an audio signature to identify a tuned media program, the audio sensor being configured to detect a predetermined audio signal emitted by a media presentation device when the media presentation device is on, the audio sensor being configured to detect the predetermined audio signal when there is no wall or floor between the media presentation device and the audio sensor and to not detect the predetermined audio signal when there is a wall or floor between the media presentation device and the audio sensor;

an analog-to-digital converter in communication with the audio sensor, and configured to convert the detected audio signal into a set of digital audio samples; and a digital signal processor in communication with the analog-to-digital converter, the digital signal processor being configured to attempt to process the set of digital audio samples and to cause the at least one of the audio code and the audio signature to be disregarded when the predetermined audio signal is not detected.

7. A media presentation device proximity sensor system as defined in claim 6, wherein the digital signal processor implements a sliding Fast Fourier Transform (FFT) to attempt to process the set of digital audio samples.

8. A media presentation device proximity sensor system as defined in claim 7, wherein the sliding FFT is used to monitor a spectral power density indicative of whether the media presentation device is powered on with no wall or floor between the media presentation device and the audio sensor.

9. A media presentation device proximity sensor system as defined in claim 6, wherein the digital signal processor determines whether to discard the at least one of the audio code and the audio signature by comparing a ratio $$R_n = \frac{P_{Bin1}}{P_{Bin3} + P_{Bin2} + P_{Bin3}}$$

to a threshold, wherein each of $P_{Bin1}$, $P_{Bin2}$, $P_{Bin3}$, respectively represents a spectral power of a corresponding frequency bin.

10. A media presentation device proximity sensor system as defined in claim 6, wherein the digital signal processor determines whether to discard the at least one of the audio code and the audio signature by comparing a ratio of power spectral values for at least two frequency bins to mitigate a clipping effect which occurs when audio power exceeds a maximum power allowed by an automatic gain control circuit.

* * * * *